United States Patent [19]

Satō

[11] 4,020,885
[45] May 3, 1977

[54] TIRE CHAIN FOR THE PROTECTION AND SLIP PREVENTION OF VEHICLE TIRES

[75] Inventor: Kazuhiro Satō, Chiba, Japan

[73] Assignee: Mitsubishi Seiko Kabushiki Kaisha, Tokyo, Japan

[22] Filed: Oct. 17, 1975

[21] Appl. No.: 623,326

[52] U.S. Cl. .............................. 152/239; 152/178; 152/241; 152/243

[51] Int. Cl.² .......................................... B60C 27/06

[58] Field of Search .......... 152/231, 232, 233, 239, 152/241, 243, 178, 180

[56] References Cited

UNITED STATES PATENTS

| | | | |
|---|---|---|---|
| 1,917,161 | 7/1933 | Smith | 152/239 |
| 2,086,512 | 7/1937 | Reyburn | 152/239 |
| 3,426,823 | 2/1969 | Rieger | 152/231 |
| 3,603,371 | 9/1971 | Muller | 152/239 |
| 3,768,534 | 10/1973 | Gower | 152/239 |
| 3,768,536 | 10/1973 | Rieger | 152/239 |
| 3,802,477 | 4/1974 | Sobota | 152/231 |

*Primary Examiner*—Drayton E. Hoffman
*Attorney, Agent, or Firm*—Wenderoth, Lind & Ponack

[57] ABSTRACT

A tire chain for the protection and slip prevention of vehicle tires comprising a number of main metal nets and a number of supplemental metal nets, whereby the necessary number of main and supplemental metal nets respectively are disposed side by side in accordance with the peripheral length of the tire on which the chain is to be mounted and adjoining metal nets are connected together by suitable connectors.

5 Claims, 9 Drawing Figures

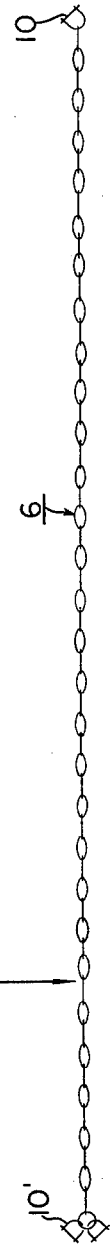
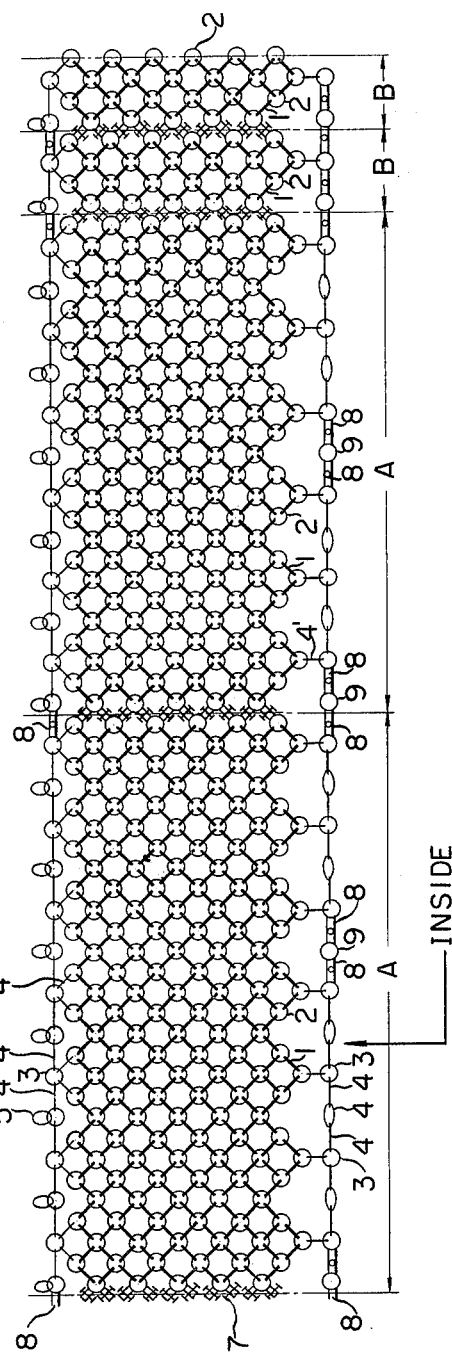
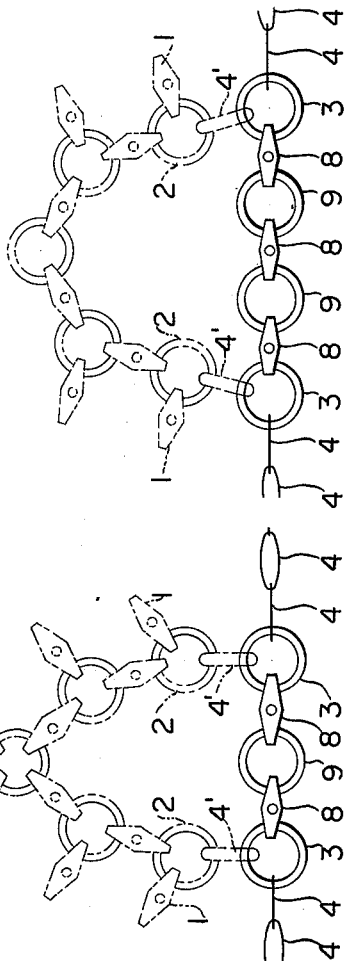
FIG. 1
FIG. 4
FIG. 5
FIG. 6

TIRE CHAIN FOR THE PROTECTION AND SLIP PREVENTION OF VEHICLE TIRES

BACKGROUND OF THE INVENTION

The present invention relates to a tire chain and more particularly to a tire chain used for protecting as well as preventing the slippage of rubber tires used by construction or loading vehicles.

Conventional tire chains of this kind are generally composed of three separate components which are manufactured individually: earth contacting elements, inside chains and outside chains. When such tire chains are to be mounted on vehicle tires, the above three components must be assembled together at the side of the vehicles by suitable connectors so that they become integrally fastened to the respective tires. However, since the number of connectors is very large, the process of assembling these components at the side of the vehicles necessarily requires a very long time, and the operation of these valuable vehicles must be inevitably suspended for the amount of time corresponding to assembly. This has caused a substantial loss in economy.

In addition, conventional tire chains were difficult to accomodate to tires different from the ones for which they were designed. In other words, a conventional tire chain could only be mounted on the vehicle tires for which it was designed.

SUMMARY OF THE INVENTION

One object of the present invention is to provide a tire chain for the protection and slip prevention of vehicle tires which requires only a short time for mounting.

Another object of the present invention is to provide a tire chain for the protection and slip prevention of vehicle tires which is adaptable enough to be mounted onto vehicle tires of different sizes.

The present invention provides a tire chain for the protection and slip prevention of vehicle tires wherein the tire chain comprises one or more main metal nets each of which has a width substantially corresponding to the peripheral width of the tread of the tire on which the chain is to be mounted and a length corresponding to a fraction of the peripheral length of the tread of the tire on which the chain is to be mounted, as well as one or more supplemental metal nets each of which has a width identical to that of the main metal nets and a length much shorter than that of the main metal nets. In assembling the main and supplemental metal nets into the tire chain, depending on the peripheral length of the tread of the tire on which the chain is to be mounted, a necessary number of main metal nets which can substantially cover the peripheral length of the tire and the necessary number of supplemental metal nets which cover the remaining peripheral length of the tire that cannot be covered by the main metal nets are arranged side by side and loosely connected together at the respective adjoining portions by suitable connector means.

In the preferred embodiment of the present invention, there is provided a tire chain for the protection and slip prevention of vehicle tires comprising the main and supplemental metal nets wherein each of the metal nets comprises a number of link members arranged regularly on a plane so as to form a net-like configuration; a number of O-rings loosely connecting the adjoining link members near their respective ends; an inside chain loosely connecting the O-rings disposed in the nearmost side; and an outside chain loosely connecting the O-rings disposed in the outermost side.

BRIEF DESCRIPTION OF THE DRAWINGS

These and other objects of the present invention will become more apparent after reading the following specification and referring to the following attached drawings, in which:

FIG. 1 is an exploded view of one embodiment of the present invention;

FIGS. 4 to 6 respectively show a portion of the inside chain to indicate how its length can be adjusted by the adjusting O-rings.

DESCRIPTION OF THE PREFERRED EMBODIMENTS

Referring to FIG. 1 of the drawings, the tire chain according to the present invention generally comprises a number of main metal nets A each having a length longer than each of a number of supplemental metal nets B. Each of the main and supplemental metal nets A and B has substantially an identical constitution, except for length, and mainly comprises an earth contacting portion, an inside chain and an outside chain.

Figure 2:
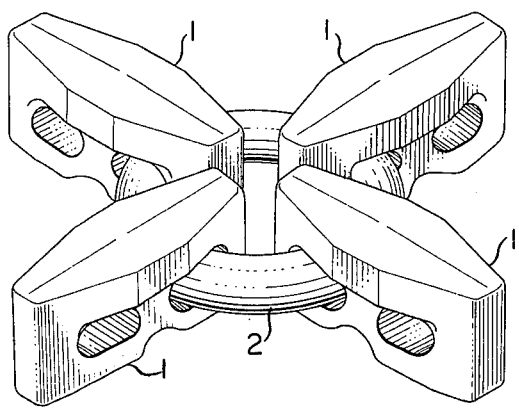
FIG. 2 is a perspective view showing four link bodies and one O-ring loosely connecting them together.

The earth contacting portion of the main and supplemental metal nets A and B is composed of a number of link members 1 and a number of O-rings 2 as shown in FIG. 1. The link member 1 generally comprises a horizontal earth contacting member having a rhombic configuration of a substantial thickness, and a vertical wall integrally suspended centrally from the under surface of the earth contacting member with a substantial thickness as shown in FIG. 2. Each link member 1 has also two holes drilled horizontally in its vertical wall so as to lie symmetrical to the vertical central axis. It is preferable that the link members 1 be manufactured by the forging process. The O-rings 2 generally has a circular ring form and should be manufactured from a round steel rod by a bending and a welding process. A number of link members 1 and O-rings 2 are assembled together in such a manner that four respective link members 1 regularly distributed on a plane so as to cause their ends to come near are loosely connected together by an O-ring 2 put through their neighboring holes. In order to do so, the O-ring 2 must be temporally severed at a portion which can be spread apart so as to allow it to be put through the respective holes of link members 1. After it is put through the four holes, the cut portion is closed and welded together. Thus, a net having generally lozenge-shaped meshes with regularly distributed link members 1 and O-rings 2 loosely connecting four respective link members 1 is obtained as shown in FIGS. 1 to 3.

Figure 3:
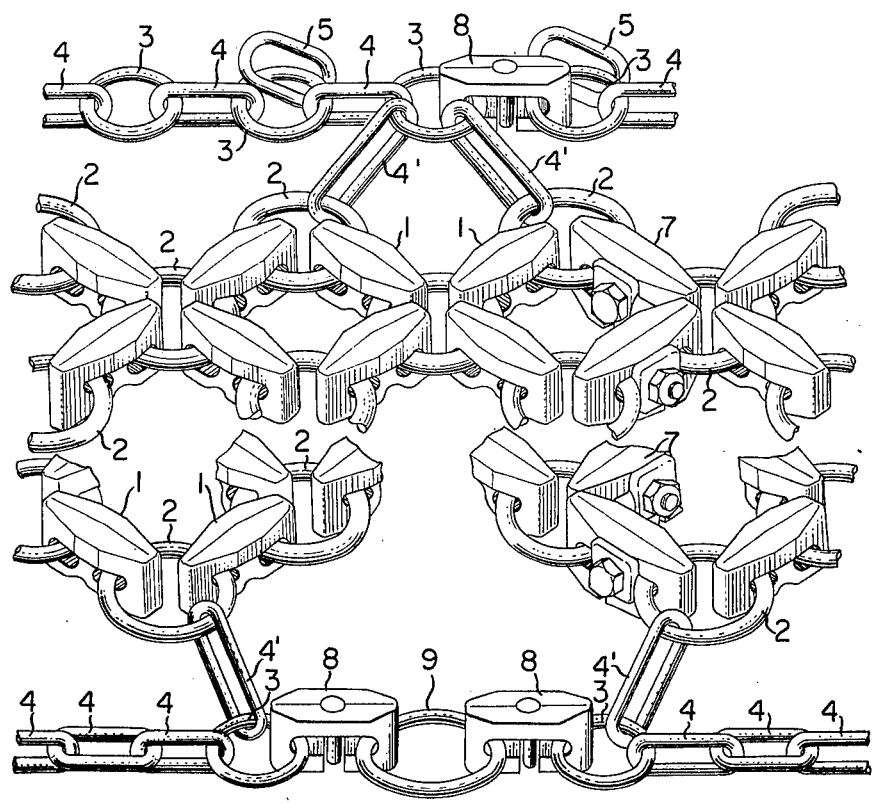
FIG. 3 is a partial perspective view of FIG. 1 showing a portion of the outside chain as well as a portion of the nets, and indicating how the adjoining O-rings of the confronting nets are connected together by the connector means.

As shown in FIG. 3, the outside chain comprises a number of short links 4, a corresponding number of small O-rings 3 loosely linking the adjoining short lines 4, a number of short links 4' which are loosely linked to small O-rings 3 in pairs, and a number of elliptical O-rings 5 which are loosely linked to small O-rings 3 alternately, whereby respective short links 4' are also respectively loosely linked to the respective outermost O-rings 2 of the main and supplemental metal nets A or B. At this point it will be noticed that short link 4' may be replaced by short link 4.

Figure 7:
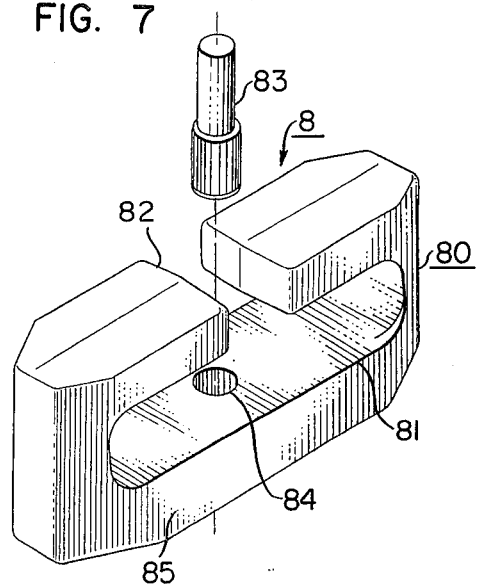
FIG. 7 shows an enlarged exploded view of a connector 8 shown in FIG. 1.

Similar to the outside chain, the inside chain comprises a number of short links 4, loosely linking together a corresponding number of small O-rings 3 loosely linking the adjoining short links 4, and a number of short links 4' loosely linking the innermost O-rings 2 of main and supplemental metal nets A or B to confronting small O-rings 3. At this point it will be noticed that short link 4' may be replaced by short link 4 as in the case of the outside chain. Further, in the inside chain several of the short links 4 and the small O-rings 3 may be replaced by a required number of adjusting O-rings 9 and connectors 8 in order to accomodate for a slight difference in the dimension of the tire. That is, when the length or dimension of the tire chain is somewhat too long or too large for the tire on which it is mounted, if the whole length of the tire chain is made shorten by replacing a number of short links 4 and small O-rings 3 with one connector 8 (see FIG. 4) or two connectors 8 and one O-ring 9 loosely connecting both (see FIG. 5), the tire chain can be snugly mounted on the tire by tightening the tire chain because the whole surface of the tire chain comes nearer to the inner side of the tire in conjunction with the vehicle. Conversely, when the length of the tire chain is too short or its dimension is too small for the tire length or size to be mounted, a number of the short links 4 and small O-rings 3 can be replaced by a number of adjusting O-rings 9 and connectors 8 (see FIG. 6). By doing so, the overall length of the inner chain becomes somewhat longer so that the whole surface of the tire chain comes nearer to the outer side of the tire. Accordingly, in this case, if the tire chain to be disposed on the tire at the outside of the vehicle to be described later is tightened, the tire chain can be snugly mounted on the tire. Each connector 8 has, as shown in FIG. 7, a main body 80 generally similar to that of link member 1 of the main and supplemental metal nets A or B with the exception that its vertical wall has drilled within it a slot 81 which is in communication with the outside through a slit 82 formed in the bottom. Slot 81 is adapted to receive adjoining small O-rings 3 or adjusting O-rings 9 passed through slit 82, and slit 82 is adapted to be closed by a pin 83 passing through it which can be forcedly fit into a hole 84 drilled within the lower wall 85 of slot 81, thereby constituting the earth contacting side and thus preventing the small O-rings 3 or adjusting O-rings 9 from coming out.

In the present invention a required number of main metal nets A are previously fastened together longitudinally at assembly plants by connecting the abutting O-rings 2 of the earth contacting portions, by jointers 7 and small O-rings 3 of the outside chain and the inside chain by connectors 8, respectively, as partially shown in FIG. 3. Further, one or two supplemental metal nets B are also previously assembled at assembly plants for respective tires.

In the present embodiment, as is shown in FIG. 1, two nets of both main and supplemental metal nets A and B, respectively, are required for each rubber tire.

Figure 8:
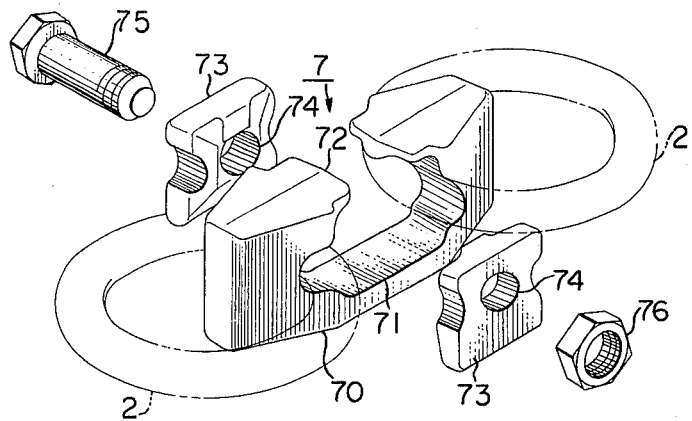
FIG. 8 shows an enlarged exploded view of a connector 7 shown in FIG. 1.

Since the constitution of connector 8 has been explained above, explanation of the the construction of jointers 7 will now be given below. Each jointer 7 comprises, as shown in FIGS. 3 and 8, a main body 70 having generally the same shape as a link member 1 except that it has a horizontal oval slot 71 in its vertical wall, and the bottom of this slot 71 is centrally cut off to provide a passage 72 for an O-ring 2. lThe fastening means comprises two bushes 73 with central holes 74, a bolt 75 and a nut 76. In connecting the abutting ends of the earth contacting portions of the two main metal nets A by connectors 7, after the respective main bodys 70 receive the corresponding O-rings 2 within their oval slots 71, the respective bushes 73 are put into the respective slots 71 from both sides and are pierced through their central holes 74 by respective bolts 75. In order to firmly secure both bushes 73, respective bolts 75 are tightened by respective nuts 76. Thus, when a required number of main metal nets A are assembled, one or two supplemental metal nets B similarly assembled are connected to the main metal nets A by means of jointers 7 and 8 according to the peripheral length of the rubber tire to which the tire chain is to be mounted. At this point it should be appreciated that the supplemental metal nets B act as a length adjusting means for the tire chain. The length of each supplemental metal net B can be previously precisely regulated by increasing or decreasing the number of rows of link members 1. Further, a slight difference in length can also be accommodated by connectors 8 and adjusting O-rings 9 of the inside chain as described before.

After the tire chain has been adjusted, its overall length is wound around the rubber tire. The abutting ends of the main and supplemental metal nets A and B are connected together on the tire by jointers 7 and connectors 8 in a manner similar to the case where the main and supplemental metal nets A and B were connected prior to their mounting.

Figure 9:
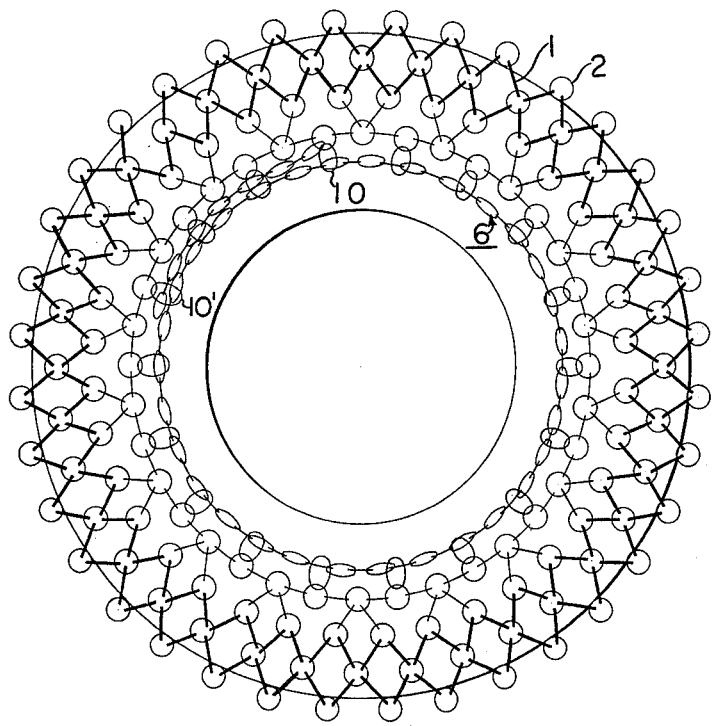
FIG. 9 is a side elevational view showing the state of the tire chain shown in FIGS. 1 to 8 after it is firmly mounted over a vehicle tire.

Further, when the tire chain is about to be mounted on the tire, the elliptical O-rings 5 of the outer chain are pierced by a tie chain 6 (FIG. 1) having any desired constitution as shown in FIG. 9. After one end of tie chain 6 is suitably secured to the body of the tire chain by such as a shackle 10, it is pulled from the other end so that the tire chain is tightly mounted over substantially the whole peripheral surface of the tire. The end of tire chain 6 is then fixedly secured to a portion of the tire chain by such means of a shackle 10'.

The advantages of the present invention having the constitution described above are as follows:

1. It effectively provides protection and slip prevention for rubber tires of vehicles used especially for construction, loading or similar purposes.

2. Since it is integrally constituted from the earth contacting portions and the inside as well as outside chains the time required for mounting it on a rubber tire can be remarkably decreased in comparison with the case of conventional tire chains. One example revealed that mounting time for the present invention was reduced to less than one tenth of that for conventional tire chains.

3. It can be easily accomodated to a slight difference in the dimension of the tire by the use of supplemental metal nets and the connectors in the inside chain.

While specific embodiments of the present invention have been illustrated and described above it is to be understood that they are provided by way of example only and that the invention is not to be construed as being limited thereto, but only by the scope of the following claims.

What is claimed is:

1. A tire chain on a tire for protecting said tire and preventing slipping thereof, said chain comprising: a plurality of main metal nets; and a plurality of supplemental metal nets of a shorter length than said main metal nets adjacent and connected to said main metal nets; said connected nets surrounding the circumference of said tire, and each of said main metal nets and said supplemental metal nets being comprised of:

a plurality of link members arranged in a rectangular, planar, net-link configuration;

a plurality of first O-rings loosely connecting adjacent link members near the ends of said link members;

an inside chain loosely connecting said first O-rings positioned along the innermost side of said rectangular configuration, said inside chain being comprised of:

a plurality of first short links, a plurality of second O-rings linking said first short links, and a plurality of second short links loosely connecting said first O-rings on the innermost side of said rectangular net configuration to said smaller second O-rings; and an outside chain loosely connecting said first O-rings positioned along the outermost side of said rectangular net-link configuration, said outside chain being comprised of:

a plurality of third short links, a plurality of smaller third O-rings linking said third short links, a plurality of fourth short links loosely connecting said first O-rings on the outermost side of said rectangular net-link configuration to said smaller third O-rings, and a plurality of elliptical O-rings loosely connected to every other smaller third O-ring.

2. A tire chain as claimed in claim 1 wherein said first, second, third and fourth short links are the same.

3. A tire chain as claimed in claim 1 further comprising:

jointer means connected between the endmost first O-rings of said main metal net and to the endmost first O-rings of said supplemental metal net for connecting said supplemental metal net to said main metal net, each jointer means comprised of:

a main body having a cutout portion for retaining therein at least one endmost first O-ring of said main metal net and at least one endmost first O-ring of said supplemental metal net, and fastening means secured to said main body for preventing said first O-rings in said main body from being removed therefrom; and connector means connected between the endmost second and third O-rings of said inside and outside chains for connecting said inside chains of said main metal net to said inside chain of said supplemental metal net and for connecting said outside chain of said main metal net to said outside chain of said supplemental metal net, each connector means comprised of:

a main body having a cutout opening therein for receiving said endmost O-rings of said inside and outside chains respectively, and pin means fitted through said main body for preventing removal of said O-rings within said main body through said cutout opening.

4. A tire as claimed in claim 3, further comprising at least one of said connector means linked between two of said second O-rings connected to said first short links.

5. A tire chain as claimed in claim 3, further comprising:

a plurality of said connector means linked together and each end thereof linked to one of two adjacent second O-rings, and at least one adjusting O-ring between and linking each pair of said connector means between said adjacent second O-rings.--

* * * * *